US010675924B2

(12) United States Patent
Milburn, Jr. et al.

(10) Patent No.: US 10,675,924 B2
(45) Date of Patent: Jun. 9, 2020

(54) TIRE INFLATION SYSTEM FOR AN AGRICULTURAL SYSTEM

(71) Applicant: CNH Industrial America LLC, New Holland, PA (US)

(72) Inventors: Rowland J. Milburn, Jr., Naperville, IL (US); Paulius R. Stonikas, Darien, IL (US); William Louis Schroeder, Cary, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/991,631

(22) Filed: May 29, 2018

(65) Prior Publication Data

US 2019/0366782 A1 Dec. 5, 2019

(51) Int. Cl.
*B60C 23/00* (2006.01)
*B60C 23/04* (2006.01)

(52) U.S. Cl.
CPC .......... *B60C 23/003* (2013.01); *B60C 23/002* (2013.01); *B60C 23/0401* (2013.01); *B60C 23/0488* (2013.01); *B60C 23/0493* (2013.01); *B60C 2200/08* (2013.01); *B60Y 2200/221* (2013.01); *B60Y 2400/306* (2013.01); *B60Y 2400/3032* (2013.01)

(58) Field of Classification Search
CPC .................................................. B60C 23/003
USPC ......................................................... 340/442
See application file for complete search history.

(56) References Cited

U.S. PATENT DOCUMENTS

| 6,144,295 | A  | 11/2000 | Adams et al. |
| 6,630,885 | B2 | 10/2003 | Hardman et al. |
| 7,302,837 | B2 | 12/2007 | Wendte |
| 7,721,813 | B2 | 5/2010  | Hou |
| 8,700,270 | B2 | 4/2014  | Foster et al. |
| 8,781,678 | B2 | 7/2014  | Hansen et al. |
| 9,078,391 | B2 | 7/2015  | Pichlmaier |
| 9,086,698 | B2 | 7/2015  | Faivre et al. |
| 9,278,587 | B2 | 3/2016  | Honig |

(Continued)

FOREIGN PATENT DOCUMENTS

GB 2539257 A 12/2016
WO 2011033015 A1 3/2011

*Primary Examiner* — Fabricio R Murillo Garcia
(74) *Attorney, Agent, or Firm* — Richard K. DeMille; Rebecca L. Henkel

(57) ABSTRACT

A tire inflation system for a work vehicle includes a controller with a memory and a processor, where the controller is configured to perform an iterative process until a stopping condition is reached. The iterative process includes receiving a tire pressure sensor signal indicative of a tire pressure a one tire, receiving a draft load sensor signal indicative of a draft load on the work vehicle, determining a draft load difference between the draft load and a maximum draft load, and outputting a target tire pressure output signal indicative of instructions to adjust the tire pressure of the tire in response to determining that the draft load difference is greater than or equal to a first threshold value. The stopping condition includes determining that the draft load difference is less than the first threshold value, determining that a variation in the draft load between iterations is less than a second threshold value, determining that a maximum runtime is reached, and determining that a maximum number of iterations is reached.

19 Claims, 4 Drawing Sheets

(56) References Cited

U.S. PATENT DOCUMENTS

| | | |
|---|---|---|
| 9,511,633 B2 | 12/2016 | Anderson et al. |
| 9,579,935 B2 | 2/2017 | Infantini |
| 2005/0087378 A1 | 4/2005 | Hrazdera |
| 2007/0068238 A1* | 3/2007 | Wendte ................. B60C 23/002 73/146 |
| 2008/0257569 A1* | 10/2008 | Foster ................... A01B 63/145 172/9 |
| 2012/0185137 A1* | 7/2012 | Schedgick ............ A01B 63/112 701/49 |

* cited by examiner

TIRE INFLATION SYSTEM FOR AN AGRICULTURAL SYSTEM

BACKGROUND

The present disclosure relates generally to a tire inflation system for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a work vehicle (e.g., a tractor, harvester, skid steer, etc.) includes a set of tires that support the work vehicle. The tires are inflated and configured to rotate to enable the work vehicle to travel across a field, a road, and other types of terrain. Typically, the work vehicle is configured to tow an agricultural implement. Examples of agricultural implements include seeding implements, plowing implements, fertilizing implements, and other kinds of agricultural implements. The work vehicle tows the agricultural implement via a hitch of the work vehicle, a drawbar of the agricultural implement, or other suitable means of towing. As the work vehicle tows the agricultural implement, the draft load experienced at the hitch and/or the drawbar may vary due to certain factors, including the amount of agricultural product in the agricultural implement, the slope on which the work vehicle is traveling, the type of terrain on which the work vehicle is traveling, current tire pressure, current tire wear, etc. Because tire pressure is typically fixed for field operations, a draft load may not remain within a target range during field operations, thereby reducing the efficiency of agricultural operations.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a tire inflation system for an agricultural system includes a controller with a memory and a processor. The controller is configured to perform an iterative process until a stopping condition is reached. The iterative process includes receiving a tire pressure sensor signal indicative of a tire pressure a one tire, receiving a draft load sensor signal indicative of a draft load on a work vehicle, determining a draft load difference between the draft load and a maximum draft load, and outputting a target tire pressure output signal indicative of instructions to adjust the tire pressure of the tire in response to determining that the draft load difference is greater than or equal to a first threshold value. The stopping condition includes determining that the draft load difference is less than the first threshold value, determining that a variation in the draft load between iterations is less than a second threshold value, determining that a maximum runtime is reached, and determining that a maximum number of iterations is reached.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
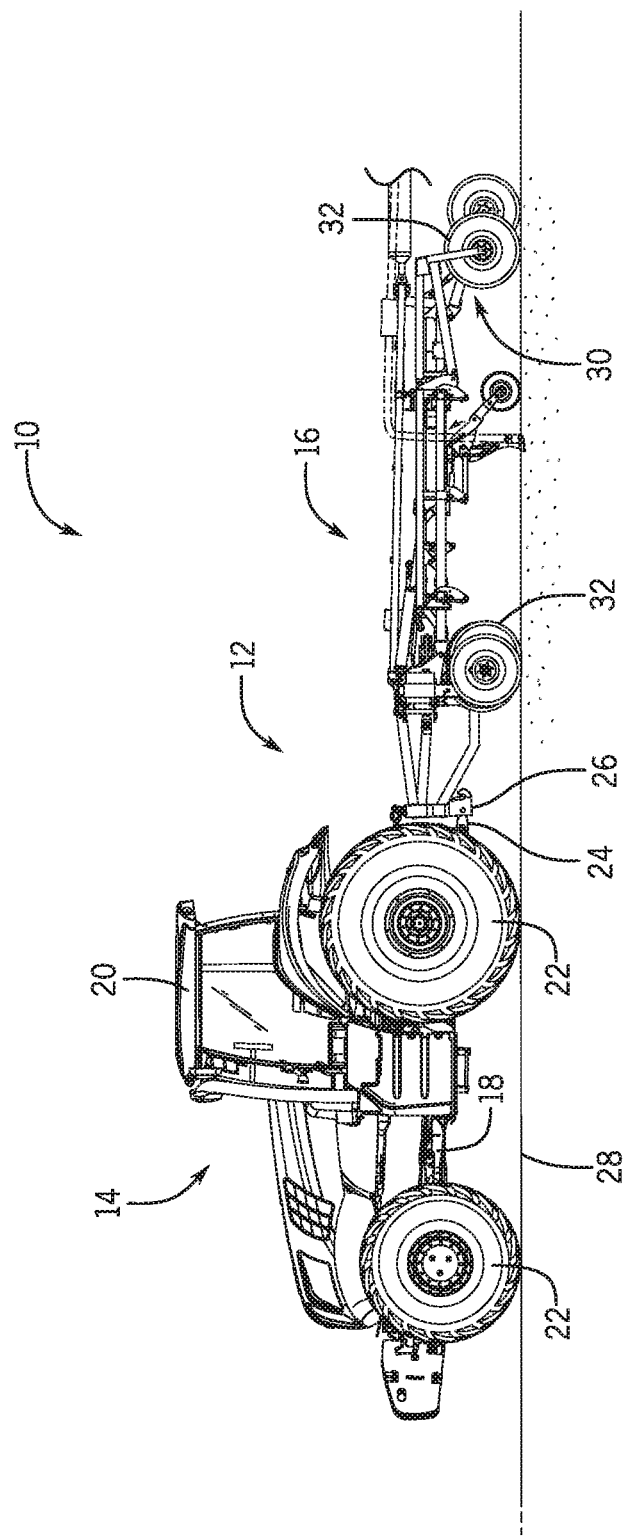
FIG. 1 is a side view of an embodiment of an agricultural system that includes a tire inflation system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a tire inflation system for an agricultural system. Certain agricultural systems include a work vehicle and an agricultural implement. Certain work vehicles include tires that are configured to enable the work vehicle to traverse a field, a roadway, and other types of terrain. The work vehicle and the agricultural implement may be coupled together, such that the work vehicle tows the agricultural implement. Certain work vehicles are connected to an agricultural implement at a hitch of the work vehicle. As the work vehicle tows the agricultural implement, the work vehicle experiences a draft load at the hitch. Maintaining a maximum draft load to account for at least some of these factors is desirable, because a maximum draft load allows the agricultural system to operate efficiently (e.g., to save fuel and fuel additives). A maximum draft load efficiently translates work performed by a work vehicle to an agricultural implement such that a potential energy loss of the agricultural system is reduced.

Maximizing the draft load of the agricultural system may include determining a maximum draft load that the agricultural system may generate for a given set of factors or conditions that may affect draft load. Such factors or conditions may include a speed of the work vehicle, the type of implement towed by the work vehicle (e.g., whether the particular type of implement penetrates a ground surface), environmental conditions (e.g., type of terrain), other conditions and factors, or a combination thereof. The maximum draft load is the highest draft load that the agricultural system may generate given the set of factors and conditions. The maximum draft load is associated with and corresponds to a specific tire pressure for an individual tire or a set of tires. Therefore, after determining the tire pressure associated with the maximum draft load, the tire inflation system may adjust tires of the agricultural system to the tire pressure associated with the maximum draft load.

Accordingly, in certain embodiments, a tire inflation system may be configured to iteratively adjust a tire pressure to maximize a draft load. The tire inflation system includes a controller. The controller is configured to receive a sensor signal indicative of a draft load, which may be from a hitch draft load sensor, a drawbar draft load sensor, or a combination thereof. The controller also receives a sensor signal indicative of a current tire pressure of an agricultural system. The controller iteratively determines a draft load difference between the draft load and a maximum draft load and outputs a target tire pressure output signal indicative of instructions to adjust the tire pressure of at least one tire in response to determining that the draft load difference is greater than or equal to a first threshold value. The controller is configured to repeat this iterative process until a stopping condition is reached, which may include determining that the draft load difference is less than the first threshold value, determining that a variation in the draft load between iterations is less than a second threshold value, determining that a maximum runtime is reached, and determining that a maximum number of iterations is reached.

With the foregoing in mind, the present embodiments relating to tire inflation systems and methods may be utilized in any suitable agricultural system. For example, FIG. 1 is a side view of an embodiment of an agricultural system 10 having a tire inflation system 12. The agricultural system 10 includes a work vehicle 14 and an implement 16. The work vehicle 14 is coupled to the implement 16 and is configured to tow the implement 16. While in the illustrated embodiment, the work vehicle 14 is coupled to a single implement 16, in some embodiments, the work vehicle 14 may tow more than one implement 16.

In the illustrated embodiment, the work vehicle 14 includes a body 18 configured to house a motor, a transmission, components of the tire inflation system, other systems of the work vehicle 14, or a combination thereof. Additionally, the work vehicle 14 includes a cab 20 configured to house an operator. However, in some embodiments, a work vehicle may not include a cab. Moreover, the work vehicle 14 includes work vehicle tires 22, including front tires and back tires, at least some of which are configured to be driven by a drive system coupled to the motor and/or the transmission, thereby driving the work vehicle 14 along a field, a road, or any other suitable surface. The operator may steer the work vehicle 14 by manipulating or providing an input to a hand controller within the cab 14. The hand controller may be a steering wheel. However, the work vehicle 14 may be steered by any suitable controlling device, such as an electronic (e.g., automatic) controlling device located within the work vehicle 14 or remote from the work vehicle 14.

Additionally, the operator may slow or stop the work vehicle 14 by manipulating or providing an input to a brake pedal. Furthermore, the work vehicle 14 may be configured to be remotely controlled and/or to operate autonomously. While the illustrated work vehicle 14 is a tractor, the agricultural system 10 having the tire inflation system 12 described herein may include any other suitable work vehicle, such as a truck, an automobile, a harvester, a sprayer, or a skid steer. As discussed in detail herein, the tire inflation system 12 may control one or more tire pressures of each work vehicle tire 22 and/or each implement tire 32.

The work vehicle 14 may also include a motor, which may operate to drive the work vehicle 14 to move along a field and/or a road. The motor may be an electrical motor, a hydraulic motor, an internal combustion engine, or other suitable device capable of driving the tires of the work vehicle 14 to rotate to move the work vehicle 14. The work vehicle 14 includes a hitch 24 that may connect to a drawbar 26 of the implement 16 to enable the work vehicle 14 to tow the implement 16. The hitch 24 may also be coupled to other components of the implement 16. Furthermore, the work vehicle 14 may include other suitable and/or alternative devices for connecting to and towing an implement, such as a three-bar linkage, among others.

The towable implement 16 may be a seeding implement, a harvesting implement, a tillage implement, an air cart, or other suitable towable agricultural implement. In the illustrated embodiment, the implement 16 is a seeding implement that may deposit rows of seeds or other particulate material into the soil as the implement 16 is towed across a surface 28 of an agricultural field by the work vehicle 14. The implement 16 includes wheel assemblies 30 that contact the surface 28 to enable the implement 16 to be towed by the work vehicle 14. The wheel assemblies 30 include implement tires 32 which may be inflated to enable the implement 16 to travel along a field, a road, or other suitable surface.

Figure 2:
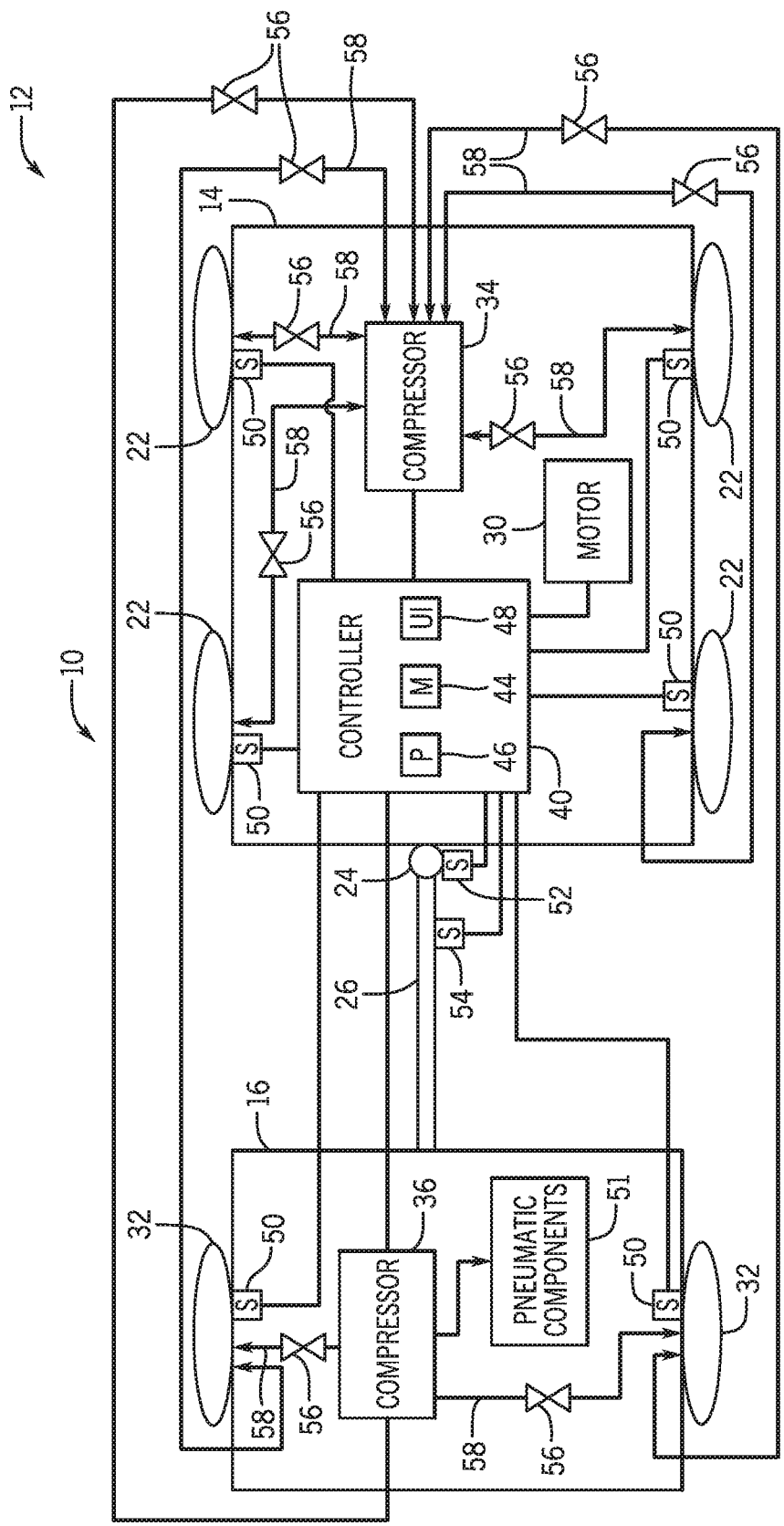
FIG. 2 is a schematic diagram of an embodiment of a tire inflation system that may be employed within the agricultural system of FIG. 1.

FIG. 2 is a schematic diagram of an embodiment of a tire inflation system 12 that may be employed within the agricultural system of FIG. 1. In the illustrated embodiment, the tire inflation system 12 includes a compressor 34. In certain embodiments, a reservoir may be positioned downstream from the compressor 34 and may be configured to store compressed air for subsequent delivery to various components of the work vehicle 14, such as the work vehicle tires 22. The compressor 34 is configured to receive ambient air at atmospheric pressure, to compress the air, and to output the air at a higher pressure and a lower volume. The compressed air may then be used to increase tire pressure within the tires of the work vehicle 14. A controller 40 of the tire inflation system 12 is configured to control distribution of compressed air from the compressor 34 to the work vehicle tires 22.

In the illustrated embodiment, the tire inflation system also includes compressor 36 of the implement 16. A reservoir may also be positioned downstream from the compressor 36 and may be configured to store compressed air. The compressor 36 is coupled to the compressor 34 and is configured to provide additional compressed air to the tire inflation system 12. For example, the compressor 36 is configured to provide compressed air to inflate implement tires 32 and to provide compressed air to the compressor 34 for inflation of work vehicle tires 22. The controller 40 is configured to control distribution of compressed air from the compressor 36 to the implement tires 32 and/or to the compressor 34. Additionally, the compressed air from the compressor 34 and/or the compressor 36 may be used for other components of the agricultural system 10 (e.g., components of the work vehicle 14 and/or the implement 16 such as a pneumatic suspension). For example, in the illustrated embodiment, the compressor 36 is coupled to pneumatic components 51 of the implement 16. Pneumatic components 51 may include a pneumatic suspension of the implement 16.

The controller 40 includes a memory 44 and a processor 46. In some embodiments, the memory 44 may include one or more tangible, non-transitory, computer-readable media that store instructions executable by the processor 46 and/or data to be processed by the processor 46. For example, the memory 44 may include random access memory (RAM), read-only memory (ROM), rewritable non-volatile memory such as flash memory, hard drives, optical discs, other types of memory, or a combination thereof. Additionally, the processor 46 may include one or more general purpose microprocessors, one or more application specific processors (ASICs), one or more field programmable logic arrays (FPGAs), or any combination thereof.

The controller 40 may further include a user interface 48 that may facilitate communication between the controller 40 and a user (e.g., operator). The user interface 48 may be disposed within the cab of the work vehicle 14 or at a remote location in the case of a remotely controlled or autonomously operated work vehicle. For example, the user interface 48 may include one or more of a button, a keyboard, a mouse, a trackpad, and/or the like to enable user interaction with the controller 40. Additionally, the user interface 48 may include an electronic display to provide a visual representation of information, for example, via a graphical user interface (GUI), an application interface, text, a still image, video content, or a combination thereof. The user interface 48 may be configured to receive inputs from a user.

In operation, the controller 40, via the processor 46, may receive various input signals from sensors throughout the tire inflation system 12, the hitch 24, the drawbar 26, other components of the work vehicle 14 and/or the implement 16, or a combination thereof. In some embodiments, these input signals received by the controller 40 may be stored in the memory 44. The controller 40 may further receive inputs from the user (e.g., operator) via the user interface 48 indicative of tire pressures for each work vehicle tire 22 and/or each implement tire 32.

In some embodiments, the controller 40 may receive an input from the user interface 48 indicative of instructions to automatically adjust a tire pressure to maximize the draft load at the hitch 24 and/or drawbar 26. The inputs received by the controller 40 may cause the controller 40 to iteratively adjust a tire pressure to maximize the draft load at a particular time (e.g., when the input signal from the user interface 48 is received by the controller 40). In some embodiments, the controller 40 may be configured to iteratively adjust a tire pressure to maximize the draft load independently of an input from a user. For example, the controller 40 may be configured to automatically and iteratively adjust a tire pressure to maximize the draft load at periodic intervals (e.g., at 10 minute intervals, at 20 minutes intervals, at 30 minute intervals) and/or based upon a triggering event. As described herein, the controller 40 of the tire inflation system 12 may iteratively output signal(s) indicative of instructions to adjust each work vehicle tire 22 and/or each implement tire 32 to a target tire pressure to maximize a draft load. The target tire pressure may be a tire pressure that one or more tires of the agricultural system 10 is adjusted to during an iteration. As such, the target tire pressure is incrementally adjusted between iterations.

In some embodiments, to adjust each work vehicle tire pressure and/or each implement tire pressure to a target pressure to maximize the draft load at the hitch 24 and/or drawbar 26, the controller 40 may first receive a signal indicative of the tire pressure of each work vehicle tire 22 and/or each implement tire 32 via pressure sensors 50. The pressure sensors 50 may be disposed at each work vehicle tire 22 and/or each implement tire 32 and may measure the current tire pressure within each work vehicle tire 22 and/or each implement tire 32. The pressure sensors 50 may output respective signals indicative of the current tire pressure within each work vehicle tire 22 and/or each implement tire 32 to the controller 40. The controller 40 may receive the signals from the sensors and output signals to the user interface 48 indicative of each current tire pressure. Via the user interface 48, an operator positioned within the cab of the work vehicle 14 or positioned remotely may view each current tire pressure. The operator may input to the controller 40, via the user interface 48, signal(s) indicative of a target tire pressure for each work vehicle tire 22 and/or each implement tire 32. In some embodiments, as described herein, the controller 40 may automatically and iteratively adjust each work vehicle tire 22 and/or each implement tire 32 to a target tire pressure to maximize the draft load at the hitch 24 and/or drawbar 26. Based on the received or determined target tire pressure of each work vehicle tire 22 and/or each implement tire 32, the controller 40 may compare the current pressure of each work vehicle tire 22 and/or each implement tire 32 to the target tire pressure and may determine whether to inflate or deflate each work vehicle tire 22 and/or implement tire 32 to reach the target tire pressure for a given iteration.

In some embodiments, the target tire pressure may be the same tire pressure for all tires of the agricultural system 10 (e.g., all work vehicle tires 22 and all implement tires 32). In other embodiments, the target tire pressure may be a first tire pressure for the work vehicle tires 22 and a second tire pressure for the implement tires 32. Further, the target tire pressure for some embodiments may include a first tire pressure for a first set of work vehicle tires 22, a second tire pressure for a second set of work vehicle tires 22, a third tire pressure for a first set of implement tires 32, and a fourth tire pressure for a second set of implement tire 32. In certain embodiments, each individual work vehicle 22 and/or each individual implement tire 32 may have an independent target tire pressure as determined by the tire inflation system 12.

The tire inflation system 12 includes valves 56 disposed along distribution lines 58 between the compressor 34 and each work vehicle tire 22 and/or each implement tire 32. As illustrated, the tire inflation system 12 also includes valves 56 disposed along distribution lines 58 between the compressor 36 and each implement tire 32. In the illustrated embodiment, one valve 56 is disposed along each distribution line 58 to control movement of air to and from the corresponding work vehicle tire 22 and/or implement tire 32 to increase or decrease the pressure within each respective work vehicle tire 22 and/or implement tire 32. In some embodiments, one valve may be configured to control the pressure of multiple tires. In some embodiments, the controller 40 may output an output signal to each valve 56 indicative of instructions to inflate or deflate each work vehicle tire 22 and/or implement tire 32 to the target tire pressure. For each work vehicle tire 22 and/or implement tire 32 having a pressure above the target tire pressure, the controller 40 may instruct the valve 56 to release air from the tire. For each work vehicle tire 22 and/or implement tire 32 having a tire pressure below the target tire pressure, the controller 40 may instruct valve 56 to enable compressed air from the compressor 34 to flow to the tire. The sensors 50 disposed at each work vehicle tire 22 and/or each implement tire 32 may output input signals to the controller 52 indicative of the tire pressure in each work vehicle tire 22 and/or each implement tire 32 as each tire is being inflated or deflated. Based upon the signals received from the sensors 50, the controller 40 may determine when the target tire pressure is reached within each work vehicle tire 22 and/or each implement tire 32. When the controller 40 determines that the pressure in each work vehicle tire 22 and/or each implement tire 32 corresponds to the target tire pressure for that tire, the controller may output instruction signals to the close the corresponding valves 56. The tire pressure in each work vehicle tire 22 and/or each implement tire 32 corresponds to a target tire pressure when the tire pressure equals the target tire pressure or when a difference between the tire pressure and the target tire pressure is less than a threshold value. The threshold value may be a value entered by a user or may be a preset value. For example, the threshold value may be a percentage difference (e.g., 1%, 2%, 5%, etc.) between the tire pressure and the target tire pressure or may be an actual pressure difference between the tire pressure and the target tire pressure (e.g., 1 psi, 2 psi, 5 psi, etc.).

In some embodiments, the user may provide an input to the user interface 48 indicative of instructions to control tire pressure to maximize the draft load at a particular time (e.g., when the signal is received by the controller). For example, the user may determine that the work vehicle 14 and/or implement 16 is about to travel across a particular type of terrain (e.g., an incline/decline, a muddy area, a sandy area, a paved road, etc.) that may affect the maximum draft load. Based upon a change in terrain, the user may initiate the sequence in which the controller 40 iteratively adjust a tire pressure of the agricultural system 10 to maximize a draft load.

In some embodiments, the user may provide an input to the user interface 48 indicative of instructions to iteratively adjust a tire pressure to maximize the draft load based upon a triggering event. As described herein, the tire inflation system 12 may include sensors configured to detect various triggering events that may cause the controller 40 to iteratively adjust a tire pressure to maximize the draft load. Examples of triggering events include a change in terrain (e.g., from a road to a field or terrain changes within a field), a change in vehicle speed, a change in vehicle and/or implement weight, or a combination thereof. The tire inflation system 12 and controller 40 may also be configured to automatically detect such triggering events and, accordingly, iteratively adjust a tire pressure to maximize the draft load independent of an input received from the user.

In some embodiments, the user may provide an input to the user interface 48 indicative of instructions to iteratively adjust a tire pressure to maximize the draft load at periodic intervals. For example, the user may provide an input to the user interface 48 indicative of instructions to iteratively adjust the tire pressure to maximize the draft load every 10 minutes, 20 minutes, 30 minutes, 60 minutes, and for other periods of time. The tire inflation system 12 and controller 40 may also be configured to automatically and iteratively adjust the tire pressure to maximize the draft load at periodic intervals independently of an input received from the user.

As discussed herein, when the controller 40 receives an input signal indicative of instructions to iteratively adjust a tire pressure to maximize the draft load, or when the controller 40, independently of an input signal, is triggered to iteratively adjusting the tire pressure to maximize the draft load is required, the controller 40 may initiate an iterative sequence to adjust the tire pressure to maximize the draft load at the hitch 24 and/or drawbar 26. The controller 40 continues the iterative process until a stopping condition is reached. The stopping condition may include determining that a difference between a sensed draft load and a maximum draft load is less than a first threshold value, determining that a variation in the draft load between iterations is less than a second threshold value, determining that a maximum runtime is reached, and/or determining that a maximum number of iterations is reached.

Figure 3:
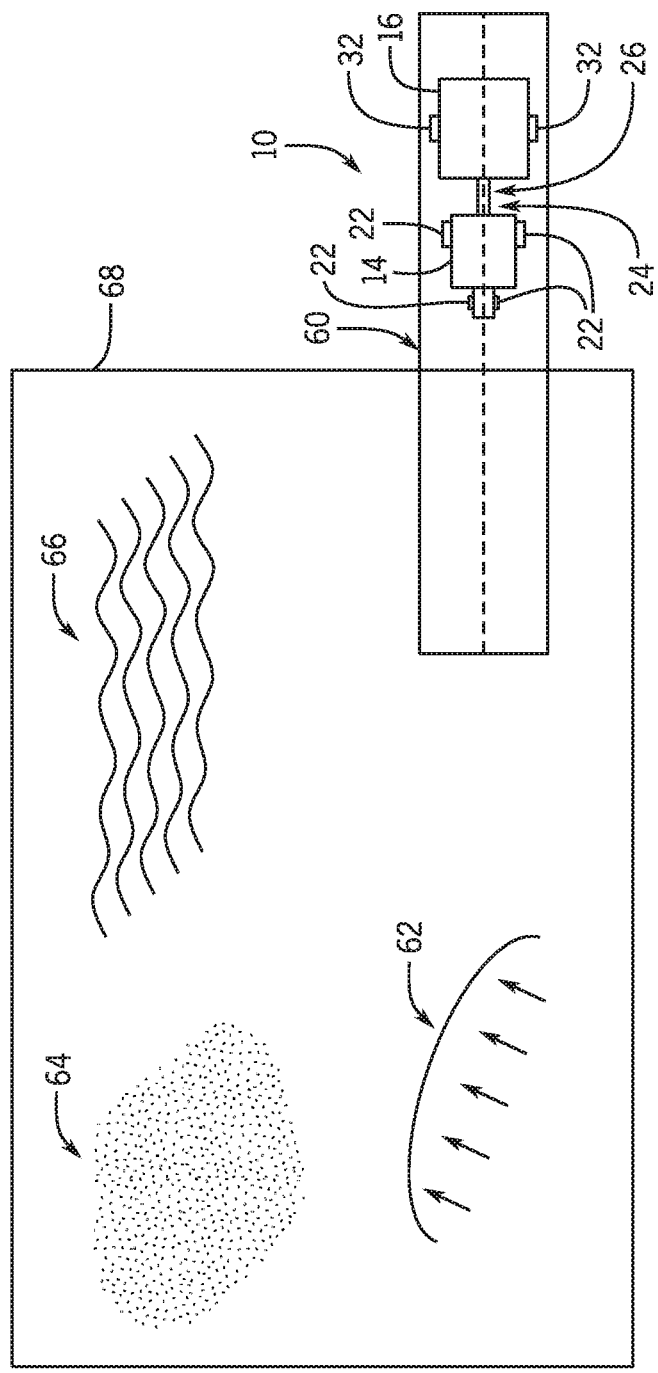
FIG. 3 is a schematic diagram of an embodiment of a geographical area in which the agricultural system of FIG. 1 may be employed.

FIG. 3 is a schematic diagram of an embodiment of a geographical area in which the agricultural system 10 of FIG. 1 may be employed. The work vehicle 14 and the implement 16 may travel across various types of terrain. For example, the work vehicle 14 may be driven on a road 60, an incline 62, a sandy area 64, and a muddy area 66. In some embodiments, the work vehicle 14 may tow the implement 16 across each of these types of terrain. As illustrated, the work vehicle 14 and the implement 16 are positioned on the road 60. The road 60 may be a paved road, a dirt road, or other suitable forms of road that support the work vehicle 14 and the implement 16.

Each type of terrain included in FIG. 3 may affect the tire pressure that maximizes the draft load at the hitch 24 and/or the drawbar 26. For example, in terrain that is generally soft, such as the sandy area 64 or the muddy area 66 of the field 68, the tire pressure that will maximize the draft load may generally be lower to establish greater tire surface contact with the terrain. As a result, the work vehicle 14 may tow the implement 16 with a greater draft load. Increasing and maximizing the draft load improves the efficiency of the agricultural system 10 and enables the work vehicle 14 to tow the implement 16 by using less power and consuming less fuel.

The draft load at the hitch 24 and/or the drawbar 26 may be maximized by controlling tire pressure. For example, in the illustrated embodiment, the work vehicle 14 may enter the muddy area 66. Upon entering the muddy area 66, a user of the work vehicle 14 may initiate a sequence in which the controller 40 iteratively adjusts a tire pressure to maximize the draft load. The controller 40 may also automatically and iteratively adjust the tire pressure to maximize the draft load, independent of receiving an input from a user, after receiving signals from sensors indicative of a change in terrain. For example, the controller 40 may receive signals from inertial sensors that are configured to detect wheel slip, which may be indicative of a change in terrain that could affect the maximum draft load. The controller 40 may also detect the muddy area 66, along with other types of terrain, based on a field map and a vehicle location. The controller 40 and/or the user may similarly initiate a sequence in which the controller 40 iteratively adjusts the tire pressure to maximize the draft load when the work vehicle 14 and the implement 16 enter the field 68 generally, enter the sandy area 64, or enter other types of terrain.

Other forms of terrain may also affect the tire pressure that maximizes the draft load at the hitch 24 and/or the drawbar 26. The iterative sequence in which the controller 40 adjusts the tire pressure may be performed for these forms of terrain. For example, an incline 62 may affect the tire pressure that establishes the maximum draft load. If a user determines that the work vehicle 14 and the implement 16 are about to travel onto an incline 62, the user may provide an input to the controller 40 via the user interface 48 indicative of instructions to adjust the tire pressure. The controller 40 may also adjust the tire pressure upon receiving input signals from sensors indicative of the work vehicle 14 and implement 16 traveling onto an incline/decline 62 or other forms of terrain. For example, the tire inflation system 12 may include level sensors configured to detect that the work vehicle 14 and implement 16 are on an incline/decline 62, and, in response, the controller 40 may initiate an iterative sequence in which the controller 40 adjusts the tire pressure for each work vehicle tire 22 and/or each implement tire 32.

Additionally, as described herein, the controller 40 may iteratively adjust a tire pressure for each work vehicle tire 22 and/or each implement tire 32 to maximize the draft load. In some embodiments, certain types of terrain may require the tire pressure of each work vehicle tire 22 and/or each implement tire 32 to be individually and iteratively adjust to maximize the draft load at the hitch 24 and/or the drawbar 26. For example, the controller 40 may iteratively adjust a tire pressure for a rear set of work vehicle tires 22 to maximize the draft load and iteratively adjust a tire pressure for a front set of work vehicle tires 22 to maximize the draft load. The controller 40 may also iteratively adjust a tire pressure for a right set of work vehicle tires 22 and iteratively adjust a tire pressure for a left set of work vehicle tires 22 in addition to, or independent of, iteratively adjusting tire pressures for a rear set of work vehicle tires 22 and for a front set of work vehicle tires 22. Further, the controller 40 may iteratively adjust a tire pressure of a left set of implement tires 32 to maximize the draft load and iteratively adjust a tire pressure of a right set of implement tires 32 to maximize the draft load.

In some embodiments, the controller 40 may be configured to iteratively adjust a tire pressure for each work vehicle tire 22 and/or each implement tire 32 to maximize the draft load based upon the position of the work vehicle 14 and implement 16 in a field. For example, a user of the work vehicle 14 may provide inputs to the controller 40 indicative of a location of the work vehicle 14 and implement 16 within a field. The user may also provide inputs identifying certain regions of the field. Each region may include a particular type of terrain, such as the road 60, the incline/decline 62, the sandy area 64, or the muddy area 66. When, or after, the work vehicle 14 and the implement 16 enter a region, the controller 40 may iteratively adjust the tire pressure for each work vehicle tire 22 and/or each implement tire 32 to maximize the draft load. Furthermore, the controller 40 may store historical data indicating the regions of a field in which the tire pressures were iteratively adjusted to maximize the draft load. The historical data may be used by the controller 40 to control when a tire pressure is iteratively adjusted to maximize the draft load. For example, when a user of the tire inflation system uses the tire inflation system in the field 68, the user may provide inputs to the controller 40 that indicate that a tire pressure of each work vehicle tire 22 and/or each implement tire 32 should be adjusted to maximize the draft load when the work vehicle 14 enters certain types of terrain (e.g., the road 60, the incline/decline 62, the sandy area 64, the muddy area 66). The controller 40 may store these inputs indicating the various types of terrain. Thereafter, when the user operates the work vehicle 14 and the implement 16 in the field 68, the controller 40 may automatically and iteratively adjust a tire pressure for each work vehicle tire 22 and/or each implement tire 32 to maximize the draft load for each region based upon the historical data previously input by the user. In some embodiments, the controller 40 may also automatically learn the terrain of a field and store historical data indicating the types of terrain for each region of a field. In some embodiments, when the work vehicle 14 and the implement 16 travel on a paved roadway or a similar smooth surface, a tire pressure of each work vehicle tire 22 and/or each implement tire 32 may be adjusted to recommended road tire pressure(s) that may or may not correspond to a maximum draft load.

Figure 4:
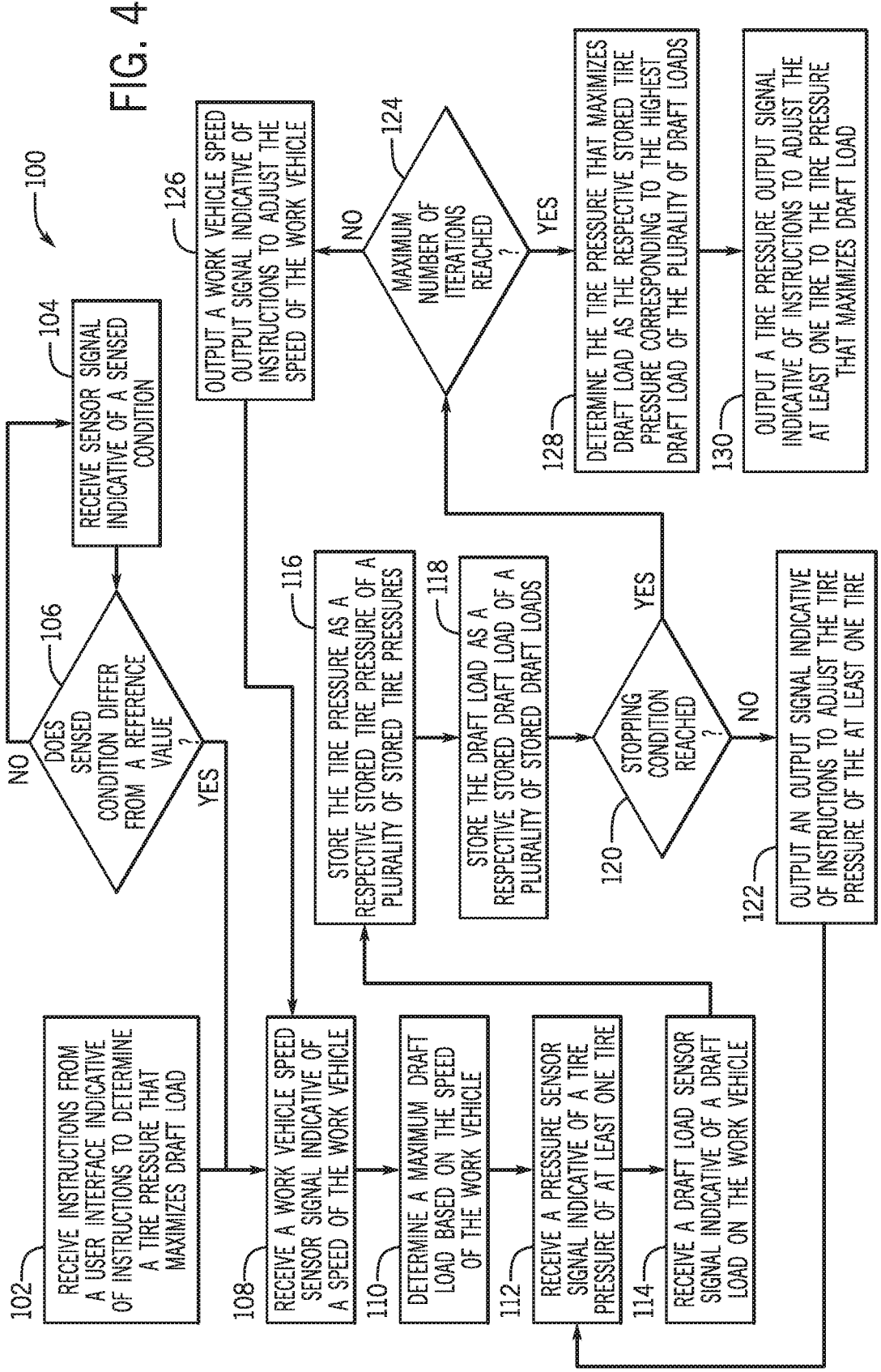
FIG. 4 is a flow diagram of an embodiment of an iterative process that may be employed by the tire inflation system of FIG. 2.

FIG. 4 is a flow diagram of an iterative process 100 that may be employed within the tire inflation system 12 of FIG. 2. The iterative process 100 may be performed by the controller and may be initiated in multiple ways. In other embodiments, the iterative process 100 may be performed by devices/elements of the tire inflation system 12 other than the controller. In some embodiments, a user of the tire inflation system 12 may manually initiate the iterative process 100 by providing an input to the user interface. The controller may receive a signal from the user interface indicative of instructions to determine a tire pressure that maximizes the draft load, as illustrated by block 102. In some embodiments, the iterative process 100 may also be initiated based on a sensed condition. For example, a sensed condition may be a change in location of the agricultural system from one type of terrain to another. A tracking sensor (e.g., a global positioning system (GPS) sensor or a radio transmission sensor) may be disposed in the agricultural system and may be configured to detect a location of the agricultural system. At block 104, the controller may receive a sensor signal indicative of the sensed condition. At block 106, the controller may compare the sensed condition to a reference value and determine if the sensed condition differs from the reference value. The reference value may be a previously detected location of the agricultural system and/or a region of a field in which the agricultural system was located. The reference value may also be entered by a user of the iterative process 100. If the sensed condition differs from the reference value, the iterative process 100 proceeds to block 108. If the sensed condition does not differ from the reference value, the iterative process 100 returns to block 104, and the controller will receive the next sensor signal indicative of a sensed condition. In the example described above, the controller 40 may receive a sensor signal indicative of a location of the agricultural system and may compare the location to a reference value. If the detected location differs from the reference value, the iterative process 100 proceeds to block 108. If the location does not differ from the reference value, iterative process 100 returns to block 104.

In certain embodiments, the iterative process 100 includes receiving a work vehicle speed sensor signal indicative of a speed of the work vehicle, as indicated by block 108. In some embodiments, the controller may also be configured to output a work vehicle speed output signal indicative of instructions to adjust the speed of the work vehicle. In response, a motor/engine of the work vehicle may adjust to a motor/engine speed corresponding to the work vehicle speed, a transmission control of the work vehicle may be adjusted according to the work vehicle speed, or a combination thereof. In some embodiments, the steps described herein related to a controller receiving a signal indicative of a vehicle speed and/or outputting a signal indicative of instructions to adjust a vehicle speed may be omitted from the iterative process 100.

The controller may determine a maximum draft load based on the speed of the work vehicle, as indicated by block 110. As used herein, "maximum draft load" refers to a draft load achieved by the work vehicle and implement with no tire slip. Other factors may also affect the maximum draft load, such as a sensed condition. For example, sensors of the work vehicle 14 and/or the implement 16 may be configured to detect a change in location that could affect the maximum draft load. Accordingly, the iterative process 100 may be configured to determine a maximum draft load for each specific set of conditions. In some embodiments, the maximum draft load may be based on the type of work vehicle and/or the type of implement being towed by the work vehicle.

The controller may also receive a signal indicative of a measured tire pressure of each work vehicle tire and/or each implement tire from the sensors, as indicated by block 112. The pressure sensors may be disposed at each work vehicle tire and/or implement tire and may measure the tire pressure within each work vehicle tire and/or implement tire. The pressure sensors may send signals indicative of the tire pressure within each work vehicle tire and/or implement tire to the controller. Additionally, the agricultural system 10 and iterative process 100 may be configured to perform various steps of the iterative process 100 based on a measured tire pressure of a single tire, an average of the measured tires pressures of multiple tires, or other variations of the measured tire pressures.

In some embodiments, the controller may also output a signal to one or more valves to adjust the tire pressure in each work vehicle tire and/or implement tire to an initial tire pressure. The initial tire pressure may be determined based on certain references, including reference tables (e.g., tire manufacturers' recommended pressure tables) indicating target tire pressure for a particular configuration of the agricultural system, historical tire pressure data relative to the terrain (e.g., historical tire pressure data for a particular field), other tire pressure references, or a combination thereof. Examples of configurations of agricultural systems include a type of work vehicle, a type of work vehicle tires, a type of implement, and a type of implement tires. The initial tire pressure may also be chosen by an operator of the tire inflation system and entered via the user interface. The controller may compare the measured tire pressure in each work vehicle tire and/or implement tire to the initial tire pressure. The controller may send a signal to a compressor/reservoir and/or a valve indicative of instructions to adjust the tire pressure in each work vehicle tire and/or implement tire to the initial tire pressure. In some embodiments, the initial tire pressure may be the same for all tires, and in other embodiments, the initial tire pressure may be different for each tire or each set of tires. In response, the compressor/reservoir and/or the valve may send compressed air to each work vehicle tire and/or implement tire that requires inflation. Alternatively, the valves may open to deflate each work vehicle tire and/or implement tire that requires deflation to reach the initial tire pressure.

The controller may receive a draft load sensor signal indicative of a draft load, as indicated by block 114. The draft load corresponds to a specific iteration of the iterative process 100 and to a specific tire pressure measured at block 112. The draft load may be measured by a draft load sensor at the hitch of the work vehicle, at the drawbar of the implement, at other suitable locations of the work vehicle and the implement that experience a draft load while the work vehicle tows the implement, or a combination thereof. The tire pressure measured at block 112 may be stored in the memory of the controller, as indicated by block 116. Similarly, the draft load measured at block 114 may be stored in the memory of the controller, as indicated by block 118. In some embodiments, the method 100 may omit the steps of storing the draft load and the tire pressure. In such embodiments, the method 100 may proceed to determining if a stopping condition has been reached.

In some embodiments, a first draft load sensor may be disposed at the hitch of the work vehicle and may be configured to measure a draft load at the hitch, and a second draft load sensor may be disposed at the drawbar of the implement and may be configured to measure a draft load at the hitch. In some embodiments, a single draft load sensor may be disposed adjacent to the hitch and the drawbar and may be configured to measure a draft load at the hitch and/or the drawbar. A draft load sensor disposed at the hitch and/or the drawbar may be a torque sensor, a strain gauge, or another type of sensor configured to detect a draft load.

After receiving and storing the sensor signals indicative of the tire pressure and the draft load, the controller may determine if a stopping condition has been reached, as shown at block 120. Examples of stopping conditions include a difference between the draft load and the maximum draft load being less than a first threshold value, a variation in the draft load between iterations being less than a second threshold value, a maximum runtime being reached, and a maximum number of iterations being reached.

As previously discussed, the maximum draft load is the draft load for the particular configuration of the work vehicle and implement that may be experienced at the hitch, drawbar, or similar component, while the work vehicle and the implement are operated without tire slippage at the measured speed. For example, a maximum draft load for a specific speed may be determined for a situation in which the environmental conditions, work vehicle operating conditions, and implement operating conditions enable the work vehicle and the implement to travel with minimum wheel slip (i.e., maximum traction) at each work vehicle tire and/or implement tire. The maximum draft load value for various work vehicle and implement configurations may be stored in the memory of the controller or may be determined by the controller. The difference between the measured draft load and the maximum draft load is compared to the first threshold value. The first threshold value may be input by a user or may be established by a manufacturer or dealer of the work vehicle or the implement. If the difference between the measured draft load and the maximum draft load is greater than or equal to the first threshold value, a stopping condition has not been reached with respect to the difference between the draft load and the maximum draft load.

Another stopping condition includes the variation in the draft load between iterations of the iterative process 100 being less than a second threshold value. The second threshold value may be input by a user of the iterative process 100 or may be established by a manufacturer or dealer of the work vehicle or the implement. If the difference between the draft loads between iterations is greater than or equal to the second threshold value, a stopping condition has not been reached with respect to the difference between the draft loads between iterations.

Other stopping conditions include a maximum run time being reached and a maximum number of iterations being reached. The maximum run time may be a period of time (e.g., 1 minute, 2 minutes, 5 minutes, 10 minutes) after which the iterative process 100 stops. In addition, the maximum number of iterations may be a number of iterations (e.g., 2 iterations, 3 iterations, 4 iterations, 5 iterations, 6 iterations, 7 iterations, 8 iterations, 9 iterations, 10 iterations, 20 iterations, 30 iterations) after which the iterative process 100 stops. After the maximum run time or maximum number of iterations are reached, a stopping condition has been reached, and the controller may proceed to block 124.

If a stopping condition has not been reached, the iterative process 100 proceeds to block 122, in which the controller outputs an output signal indicative of instructions to adjust the tire pressure of the work vehicle tires and/or the implement tires. The tire pressure adjustment may depend at least partially on the tire pressure and/or the draft load of the previous iteration of the iterative process 100. Adjusting the tire pressure may include inflating or deflating each work vehicle tire and/or each implement tire. As the tire pressure of each tire is adjusted, the iterative process 100 returns to block 112. At block 112, the sensors at each work vehicle tire and/or each implement tire then measure the tire pressure to determine when the new tire pressure has been reached for the next iteration of the iterative process 100. In some embodiments, the iterative process 100 may repeat for each tire or each set of tires.

Blocks 112, 114, 116, 118, 120, and 122 of the iterative process 100 are repeated until a stopping condition is reached. When the controller determines that a stopping condition has been reached at block 120, the iterative process 100 may proceed to block 124. At block 124, the controller may determine whether a maximum number of speed iterations has been reach. A speed iteration is an iteration of the iterative process 100 performed at a specific speed of the work vehicle (i.e., performing blocks 108 through 120 at a specific speed). The maximum number of iterations may be a value input by an operator of the tire inflation system, a value stored in the memory of the controller, or a value determined by the controller based on the operating conditions of the work vehicle. If the controller determines that a maximum number of speed iterations has not been reached, the iterative process 100 proceeds to block 126. At block 126, the controller outputs the work vehicle speed output signal indicative of instructions to adjust the speed of the work vehicle. In response, the speed of the work vehicle is adjusted. For example, a motor/engine of the work vehicle may change the motor speed/engine speed in response to receiving the work vehicle speed output signal from the controller. The iterative process 100 may then return to block 108 to determine when the new speed of the work vehicle has been reached for the next iteration of the iterative process 100.

In certain embodiments where the iterative process 100 is not repeated for multiple speeds of the work vehicle, block 124, along with block 126, may be omitted. In such embodiments, the iterative process 100 may process to block 128.

After determining that a maximum number of speed iterations has been reached at block 124, the iterative process 100 proceeds to block 128. At block 128, the controller determines a tire pressure that maximizes draft load as the respective stored tire pressure corresponding to the highest stored draft load of the plurality of draft loads. For example, if the iterative process 100 performs multiple iterations, the tire pressure may be the tire pressure that was measured and stored for the iteration in which the highest draft load was measured. Additionally, in other embodiments, the iterative process 100 may include stopping conditions other than or in addition to a maximum number of iterations being reached.

After the controller determines the tire pressure corresponding to the maximum draft load at block 128, the controller may output a tire pressure output signal indicative of instructions to adjust the work vehicle tire and/or the implement tire to the tire pressure that maximizes draft load, as indicated by block 130. After performing the iterative process 100 for a work vehicle tire and/or an implement tire, or a set of work vehicle tires and/or a set of implement tires, the iterative process 100 may be repeated for another work vehicle tire and/or another implement tire, or another set of work vehicle tires and/or another set of implement tires to determine tire pressures for those respective tires.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A tire inflation system for an agricultural system, comprising:
    a controller comprising a memory and a processor, wherein the controller is configured to perform an iterative process until a stopping condition is reached, wherein the iterative process comprises:
    receiving a tire pressure sensor signal indicative of a tire pressure of at least one tire of a work vehicle of the agricultural system, of an implement of the agricultural system, or both;
    receiving a draft load sensor signal indicative of a draft load on the work vehicle;
    determining a draft load difference between the draft load and a maximum draft load; and
    outputting a target tire pressure output signal indicative of instructions to adjust the tire pressure of the at least one tire of the work vehicle, of the implement, or both, in response to determining that the draft load difference is greater than or equal to a first threshold value;
    wherein the stopping condition comprises determining that the draft load difference is less than the first threshold value, determining that a variation in the draft load between iterations, of the iterative process, is less than a second threshold value, determining that a maximum runtime is reached, and determining that a maximum number of iterations, of the iterative process, is reached.

2. The tire inflation system of claim 1, comprising a hitch sensor disposed at a hitch of the work vehicle, a drawbar sensor disposed at a drawbar of the implement, or both.

3. The tire inflation system of claim 2, wherein the draft load sensor signal is received from the hitch sensor, the drawbar sensor, or both.

4. The tire inflation system of claim 1, wherein the controller is configured to perform the iterative process at periodic intervals.

5. The tire inflation system of claim 1, wherein the controller is configured to perform the iterative process in response to receiving an initiation signal from a user interface indicative of initiating the iterative process.

6. The tire inflation system of claim 1, wherein the controller is configured to perform the iterative process in response to receiving a position signal indicative of a position of the work vehicle.

7. The tire inflation system of claim 1, wherein adjusting the tire pressure comprises selectively inflating or deflating the at least one tire.

8. The tire inflation system of claim 7, wherein selectively inflating or deflating the at least one tire comprises controlling a valve, controlling a compressor, or both.

9. The tire inflation system of claim 1, wherein the controller is configured to determine the maximum draft load based on at least one sensed condition, a speed of the work vehicle, or both, wherein the at least one sensed condition comprises a change in location of the work vehicle.

10. At least one non-transitory computer readable medium comprising executable instructions that, when executed by a processor, cause the processor to perform an iterative process until a stopping condition is reached, wherein the iterative process comprises:
receiving a tire pressure sensor signal indicative of a tire pressure of at least one tire of a work vehicle of an agricultural system, of an implement of the agricultural system, or both;
receiving a draft load sensor signal indicative of a draft load on the work vehicle;
determining a draft load difference between the draft load and a maximum draft load; and
outputting a target tire pressure output signal indicative of instructions to adjust the tire pressure of the at least one tire of the work vehicle, of the implement, or both, in response to determining that the draft load difference is greater than or equal to a first threshold value;
wherein the stopping condition comprises determining that the draft load difference is less than the first threshold value, determining that a variation in the draft load between iterations, of the iterative process, is less than a second threshold value, determining that a maximum runtime is reached, and determining that a maximum number of iterations, of the iterative process, is reached.

11. The non-transitory computer readable medium of claim 10, wherein the at least one non-transitory computer readable medium comprises instructions that, when executed by the processor, cause the processor to perform the iterative process at periodic intervals.

12. The non-transitory computer readable medium of claim 10, wherein the at least one non-transitory computer readable medium comprises instructions that, when executed by the processor, cause the processor to perform the iterative process in response to receiving an initiation signal from a user interface indicative of initiating the iterative process.

13. The non-transitory computer readable medium of claim 10, wherein the at least one non-transitory computer readable medium comprises instructions that, when executed by the processor, cause the processor to perform the iterative process in response to receiving a position signal indicative of a position of the work vehicle.

14. The non-transitory computer readable medium of claim 10, wherein the instructions to adjust the tire pressure of the at least one tire comprise instructions to selectively inflate or deflate the at least one tire.

15. A method of adjusting a tire pressure of at least one tire of an agricultural system comprising:
performing, via a controller, an iterative process until a stopping condition is reached, wherein the iterative process comprises:
receiving, via the controller, a tire pressure of the at least one tire of a work vehicle of the agricultural system, of an implement of the agricultural system, or both;
receiving, via the controller, a draft load on the work vehicle;
determining, via the controller, a draft load difference between the draft load and a maximum draft load; and
adjusting, via the controller, the tire pressure of the at least one tire of the work vehicle, of the implement, or both, in response to determining that the draft load difference is greater than or equal to a first threshold value;
wherein the stopping condition comprises determining that the draft load difference is less than the first threshold value, determining that a variation in the draft load between iterations, of the iterative process, is less than a second threshold value, determining that a maximum runtime is reached, and determining that a maximum number of iterations, of the iterative process, is reached.

16. The method of claim 15, comprising performing, via the controller, the iterative process at periodic intervals.

17. The method of claim 15, comprising performing, via the controller, the iterative process in response to receiving an initiation of the iterative process from a user interface.

18. The method of claim 15, wherein adjusting the tire pressure comprises selectively inflating or deflating the at least one tire.

19. The method of claim 18, wherein selectively inflating or deflating the at least one tire comprises controlling a valve, controlling a compressor, or both.

* * * * *